US008857889B2

(12) United States Patent
Wellborn et al.

(10) Patent No.: US 8,857,889 B2
(45) Date of Patent: Oct. 14, 2014

(54) VARIABLE DOOR CHECK SYSTEM FOR A VEHICLE

(75) Inventors: Carl W. Wellborn, Detroit, MI (US); Timothy Saunders, Warren, MI (US); Erik Rasmussen, Garden City, MI (US); Mary Ellen DeCaluwe, Oxford, MI (US); Thomas E. Houck, Bloomfield Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 134 days.

(21) Appl. No.: 13/479,712

(22) Filed: May 24, 2012

(65) Prior Publication Data

US 2013/0074412 A1 Mar. 28, 2013

Related U.S. Application Data

(60) Provisional application No. 61/538,882, filed on Sep. 25, 2011.

(51) Int. Cl.
*B60J 5/04* (2006.01)

(52) U.S. Cl.
USPC ............................... 296/146.11; 16/85; 16/82

(58) Field of Classification Search
USPC .......... 49/384; 16/86 C, 82, 85; 292/DIG. 15; 296/146.11
See application file for complete search history.

(56) References Cited

U.S. PATENT DOCUMENTS

| | | | | |
|---|---|---|---|---|
| 537,250 | A * | 4/1895 | Tynon | 292/62 |
| 2,865,045 | A * | 12/1958 | Miller | 16/322 |
| 5,273,229 | A * | 12/1993 | Komatsu | 242/545.1 |
| 6,513,193 | B1 * | 2/2003 | Yezersky et al. | 16/86 C |
| 7,739,836 | B2 * | 6/2010 | Keane et al. | 49/339 |
| 7,766,311 | B2 * | 8/2010 | Kossett | 267/154 |
| 2013/0031747 | A1 * | 2/2013 | Gobart et al. | 16/82 |

* cited by examiner

*Primary Examiner* — Gregory J Strimbu
(74) *Attorney, Agent, or Firm* — Quinn Law Group, PLLC

(57) ABSTRACT

A door check system includes a rod interconnecting a door assembly and a body of a vehicle. The door check system secures the position of the door assembly at any location along a swing path of the door assembly, between a fully open position and a fully closed position. A coil spring is disposed about the rod, with the rod extending through a central aperture thereof. An actuator is coupled to the coil spring and configured for tightening and loosening the coil spring about the rod. When the actuator tightens the spring about the rod, the spring grasps the rod and secures the position of the door assembly relative to the body. When the actuator loosens the spring from about the rod, the door assembly is free to move along the swing path.

8 Claims, 3 Drawing Sheets

VARIABLE DOOR CHECK SYSTEM FOR A VEHICLE

CROSS-REFERENCE TO RELATED APPLICATIONS

This application claims the benefit of U.S. Provisional Patent Application Ser. No. 61/538,882, filed on Sep. 25, 2011, the disclosure of which is hereby incorporated by reference.

TECHNICAL FIELD

The invention generally relates to a vehicle, and more specifically to a door check system for securing a position of a partially opened door of the vehicle at any location along a swing path of the door.

BACKGROUND

Vehicles include a door check system for each door. Typically, the door check systems operate to provide a force that secures the door in up to three or four different pre-set positions located throughout the door swing path. Accordingly, as a user opens the door and freely moves the door through the swing path of the door, the door will pass through each of the pre-set positions of the door check system. Upon reaching each of the pre-set positions, the door check system provides a retaining force that operates to secure the door in that specific position. The door may be moved past each of the pre-set positions of the door check system by applying a force greater than the retaining force, thereby overcoming the retaining force. Once the door has been swung past one of the pre-set positions of the door check system, the door once again swings freely until reaching the next pre-set position encountered upon the swing path of the door, whereupon the door check system once again applies the retaining force.

SUMMARY

A vehicle is provided. The vehicle includes a body defining a door opening, and a door assembly pivotably attached to the body. The door assembly is moveable along a swing path between a fully closed position sealing the door opening, and a fully opened position. A door check system interconnects the body and the door assembly. The door check system secures the door assembly relative to the body at any position along the swing path of the door, between the fully closed position and the fully opened position.

A door check system for a vehicle is also provided. The door check system includes a housing that is configured for attachment to one of a door assembly or a body of the vehicle, and a rod extending through the housing and moveable relative to the housing, that is configured for attachment to the other of the door assembly or the body. A coil spring is supported by the housing, and includes a plurality of coils coiled about a length of the rod. The coil spring includes a first axial end and a second axial end spaced from each other along a length of the rod, and extending out of the housing. An actuator is coupled to the first axial end and the second axial end of the coil spring. The actuator is operable to contract the coils of the coil spring against the rod to tighten the coil spring against the rod in the absence of a signal. The actuator is operable to expand the coils of the coil spring in response to a signal to loosen the coil spring about the rod.

Accordingly, the door check system may secure the door assembly at any position along the swing path of the door, between the fully closed position and the fully open position. Upon a user grasping and actuating a handle of the door assembly to unlatch the door from the body, the actuator lowers tension on the coil spring to loosen the coil spring from around the rod, thereby allowing free movement of the door assembly relative to the body. Upon the user releasing the door handle, the actuator tightens the tension of the coil spring around the rod, thereby securing the position of the rod relative to the coil spring, and preventing movement of the door assembly relative to the body of the vehicle. Alternatively, the actuator may be signaled from a release switch to loosen the coil spring from around the rod to allow free movement of the door assembly. The release switch may be located, for example, on an instrument panel so that the door check system may be released by a user, when seated within the vehicle, without grasping the handle of the door assembly.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Referring to the Figures, wherein like numerals indicate like parts throughout the several views, a vehicle is generally shown at 20. The vehicle 20 may include, for example, a Sport Utility Vehicle (SUV), a passenger sedan, a pick-up truck, or some other similar vehicle.

Figure 1:
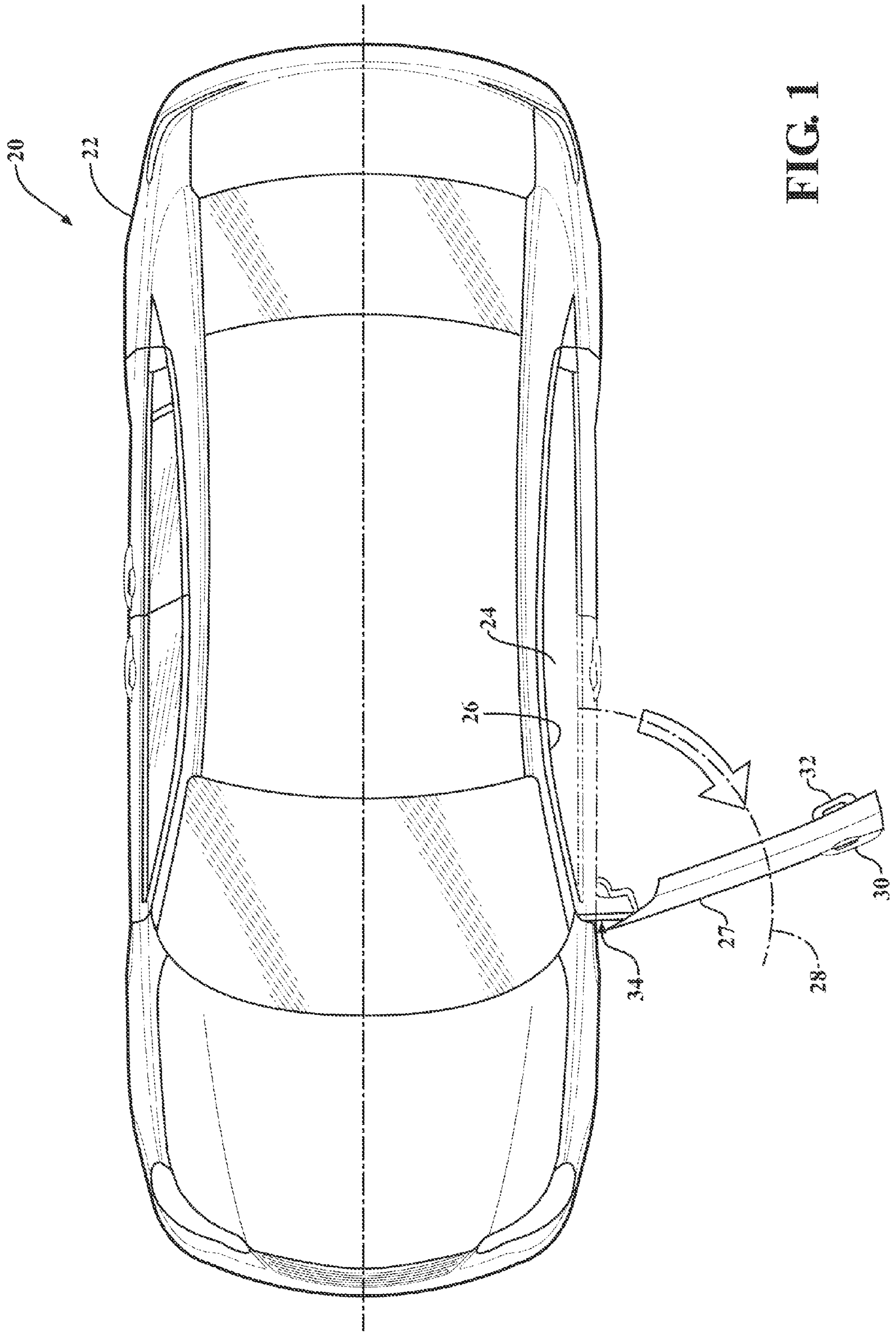
FIG. 1 is a schematic plan view of a vehicle showing a door in a partially opened position.

Referring to FIG. 1, the vehicle 20 includes a body 22 that defines an interior 24 and a door opening 26 providing access to the interior 24. A door assembly 27 is pivotably attached to the body 22. The door assembly 27 is moveable along a swing path 28 between a fully closed position and a fully opened position. When in the fully closed position, the door assembly 27 seals the door opening 26. The door assembly 27 includes an exterior handle 30, and an interior handle 32, each operatively connected to a latch mechanism (not shown) for securing the door assembly 27 relative to the body 22 when in the fully closed position. The exterior handle 30 and the interior handle 32 may include any suitable style and/or configuration of vehicular door handle that is capable of actuating the latch mechanism to release the door assembly 27 for rotation relative to the body 22.

Figure 2:
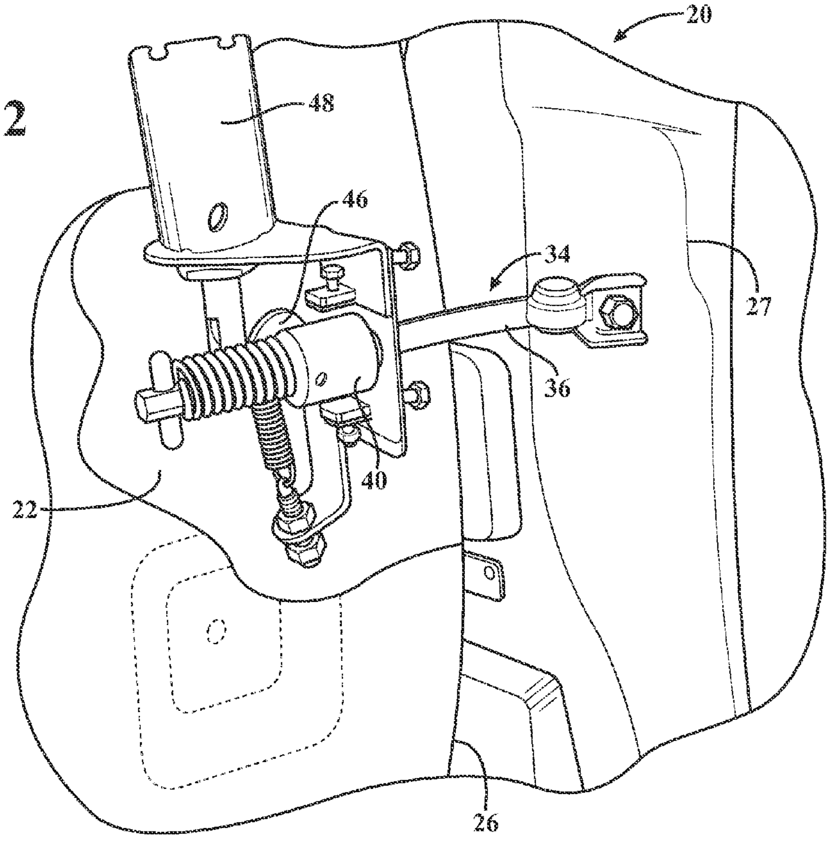
FIG. 2 is a schematic perspective view of the vehicle showing a door check system interconnecting the door assembly and a body of the vehicle.
Figure 3:
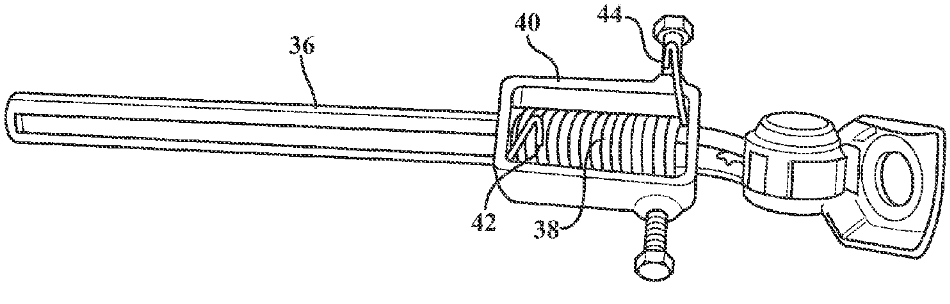
FIG. 3 is a schematic partial perspective view of the door check system.

The vehicle 20 further includes a door check system 34. The door check system 34 is configured for securing the door assembly 27 at any position along the swing path 28, between the fully closed position and the fully opened position. Referring to FIGS. 2 and 3, the door check system 34 includes a rod 36 that is attached to and interconnects the door assembly 27 and the body 22. A coil spring 38 is disposed around, and includes a plurality of coils that are coiled about the rod 36. The spring 38 is supported within a housing 40, with the rod 36 extending longitudinally through the housing 40 and a central aperture of the coil spring 38. The rod 36 is moveable relative to the housing 40. The coil spring 38 includes a first axial end 42 and a second axial end 44 spaced from each other along a length of the rod 36. Each of the first axial end 42 and the second axial end 44 extend outward of the housing 40 in spaced relationship relative to each other. The first axial end 42 and the second axial end 44 of the coil spring 38 are attached to a plate 46, which is rotatable about an axis 54.

Figure 4:
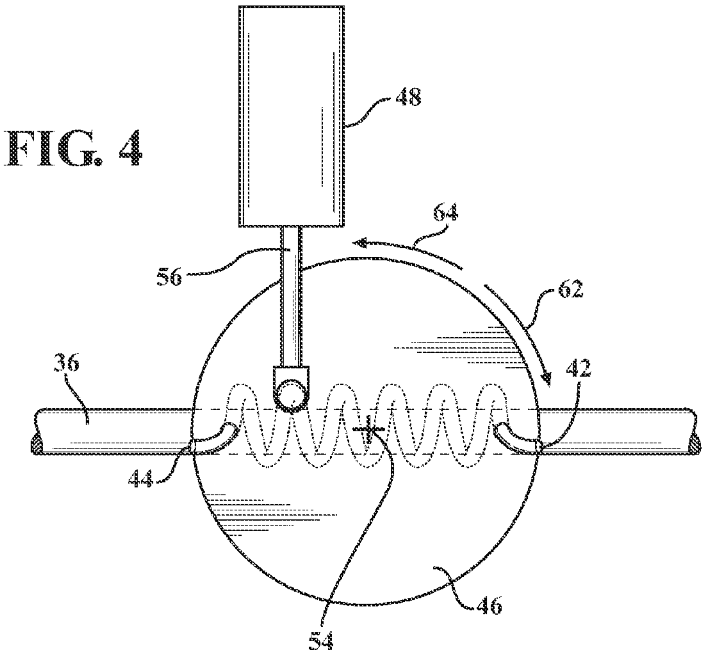
FIG. 4 is a schematic partial plan view of the door check system.

An actuator 48 is coupled to the coil spring 38. The actuator 48 is operable to contract the coils of the coil spring 38 against the rod 36 to tighten the coil spring 38 against the rod 36. The actuator 48 is also operable to expand the coils of the coil spring 38 to loosen the coil spring 38 from about the rod 36. More specifically, referring to FIG. 4, the actuator 48 is coupled to the plate 46 and configured to rotate the plate 46. Rotation of the plate 46 twists the first axial end 42 and the second axial end 44 of the coil spring 38 relative to each other. Rotation of the plate 46 in a first rotational direction 62 loosens the coil spring 38, allowing the coils of the coil spring 38 to expand radially away from the rod 36 thereby releasing the rod 36. Rotation of the plate 46 in a second rotational direction 64, opposite the first rotational direction 62, tightens the coil spring 38, causing the coils of the coil spring 38 to contract radially against the rod 36, thereby grasping the rod 36. As shown in FIG. 4, a linkage 56 interconnects the actuator 48 and the plate 46. The linkage 56 moves a linear path. Movement of the linkage 56 in a first linear direction rotates the plate 46 about the axis 54 in the first rotational direction. Movement of the linkage 56 in a second linear direction rotates the plate 46 about the axis 54 in the second rotational direction.

The actuator 48 may include but is not limited to an electric device, such as but is not limited to an electric solenoid, an electric motor, or some other similar electric device capable of tightening and loosening the coil spring 38 about the rod 36.

The actuator 48 tightens the coil spring 38 around the rod 36 to secure the position of the rod 36, thereby securing the current position of the door assembly 27 along the swing path 28 of the door. The actuator 48 loosens the spring from around the rod 36 to allow the door assembly 27 to swing freely along the swing path 28. The actuator 48 is coupled to both the exterior handle 30 and the interior handle 32 of the door assembly 27. Actuation of either the exterior handle 30 or the interior handle 32 sends a signal, such as but not limited to an electrical signal, to the actuator 48 of the door check system 34. Upon receiving the signal from one of the exterior handle 30 or the interior handle 32, the actuator 48 rotates the plate 46 to loosen the spring 38, thereby allowing free movement of the door assembly 27 along the swing path 28. Accordingly, the door assembly 27 may be opened and/or closed in the usual manner. Upon releasing either the exterior handle 30 or the interior handle 32 of the door assembly 27, the signal therefrom is interrupted, and the actuator 48 rotates the plate 46 to tighten the coil spring 38 against the rod 36, thereby securing the rod 36 relative to the body 22, and thereby securing the door assembly 27 against rotation along the swing path 28 relative to the body 22. Accordingly, the door check system 34 may secure the door assembly 27 at any position along the swing path 28 by simply releasing the exterior handle 30 and the interior handle 32 at the desired location.

Figure 5:
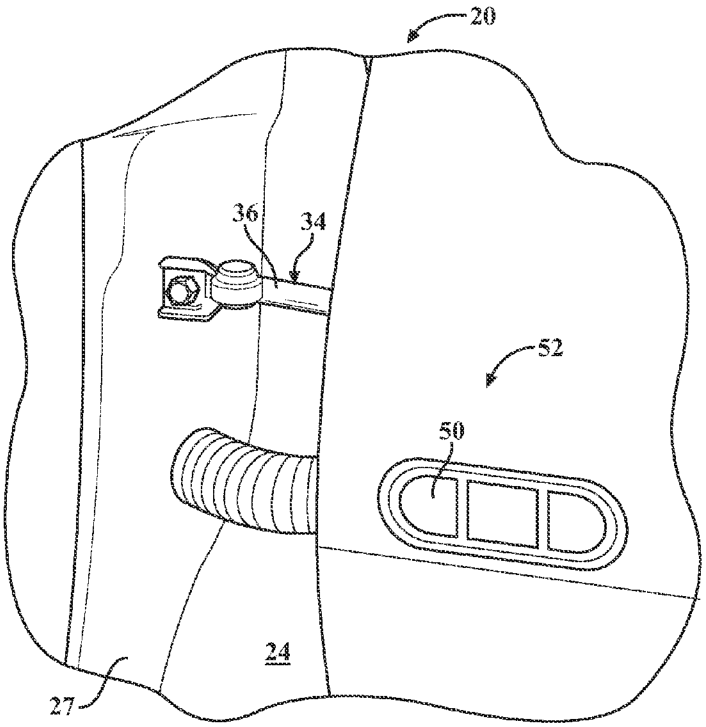
FIG. 5 is a schematic partial perspective view of an instrument panel of the vehicle showing a release switch for the door check system.

In addition to being signaled from either the exterior handle 30 or the interior handle 32 of the door assembly 27, the actuator 48 may further be coupled to a release switch 50. Referring to FIG. 5, the release switch 50 may be disposed within the interior 24 of the body 22, for example, on an instrument panel 52 of the vehicle 20. Similar to operation of either the exterior handle 30 or the interior handle 32, activation of the release switch 50 signals the actuator 48 to rotate the plate 46 to loosen the spring about the rod 36, thereby allowing free movement of the door assembly 27 along the swing path 28. Upon releasing the release switch 50, the signal therefrom is interrupted, and the actuator 48 rotates the plate 46 to tighten the coil spring 38 against the rod 36, thereby securing the rod 36 relative to the body 22, and thereby securing the door assembly 27 against rotation along the swing path 28 relative to the body 22. The release switch 50 allows an operator to release the door check system 34, thereby allowing the free movement of the door assembly 27 along the swing path 28, without having to operate one of the exterior handle 30 or the interior handle 32 of the door assembly 27. If the vehicle 20 is suitably positioned, such as on a hill, the door assembly 27 may then freely swing toward the fully closed position reducing the distance a seated operator must reach to grasp the interior handle 32 in order to close the door. The coil spring might also be loosened via a signal sent by a door motion detecting device activated by the user grasping any portion of the door and exerting an appropriate level of force to move the door to a different hold position. When the user stops the door at the new desired hold position, the actuator 48 rotates the plate 46 to tighten the coil spring 38 against the rod 36, thereby securing the rod 36 relative to the body 22, and thereby securing the door assembly 27 against rotation along the swing path 28 relative to the body 22.

While the invention is herein described in relation to a door check system 34 for securing a passenger door relative to a door opening 26, it should be appreciated that the door check system 34 may alternatively be employed with relation to other closure assemblies, such as for example, rear cargo doors of a van or SUV. Furthermore, it should be appreciated that the linkage connection between the actuator 48 and the coil spring 38 may differ from the exemplary embodiment described herein, and the actuator 48 may be configured in a different manner to tighten and loosen the coil spring 38 relative to the rod 36.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:

a body defining a door opening;

a door assembly pivotably attached to the body and moveable along a swing path between a fully closed position sealing the door opening, and a fully opened position; and a door check system interconnecting the body and the door assembly and configured for securing the door assembly relative to the body at any position of the door assembly along the swing path of the door assembly, wherein the door check system includes:

a rod having a length and interconnecting the door assembly and the body;

a coil spring coiled around an outer periphery of the rod, wherein the coil spring includes a first axial end and a second axial end spaced from each other along the length of the rod;

a plate rotatable about an axis, with the first axial end of the coil spring and the second axial end of the coil spring attached to the plate; and an actuator coupled to the coil spring and operable to contract coils of the coil spring against the rod to tighten the coil spring against the rod, and wherein the actuator is operable to expand the coils of the coil spring to loosen the coil spring about the rod;

wherein the actuator is coupled to the plate and configured to rotate the plate about the axis in both a first rotational direction and a second rotational direction, opposite the first rotational direction, wherein rotation of the plate in the first rotational direction tightens the coil spring against the rod to secure the rod relative to the coil spring and prevent movement of the door assembly relative to the body, and wherein rotation of the plate in the second rotational direction loosens the coil spring about the rod to allow the rod to move relative to the coil spring and allow the door assembly to move relative to the body.

2. A vehicle as set forth in claim 1 wherein the door check system includes a housing supporting the coil spring, with the rod extending through the housing and moveable relative to the housing.

3. A vehicle as set forth in claim 1 wherein the actuator includes an electric device.

4. A vehicle as set forth in claim 1 wherein the door check system includes a linkage interconnecting the actuator and the plate, wherein the linkage is moveable along a linear path in a first linear direction and a second linear direction, wherein movement of the linkage along the linear path in the first linear direction rotates the plate about the axis in the first rotational direction, and wherein movement of the linkage along the linear path in the second linear direction rotates the plate about the axis in the second rotational direction.

5. A vehicle as set forth in claim 1 wherein the door assembly includes at least one handle coupled to the actuator and configured to signal the actuator to loosen the coil spring from about the rod to allow the relative movement between the rod and the coil spring when the handle is actuated to open the door assembly.

6. A vehicle as set forth in claim 1 further comprising a release switch coupled to the actuator and configured to signal the actuator to loosen the coil spring from about the rod to allow the relative movement between the rod and the coil spring when the release switch is actuated.

7. A door check system for a vehicle, the door check system comprising:

a housing configured for attachment to one of a door assembly of the vehicle and a body of the vehicle;

a rod having a length, extending through the housing, moveable relative to the housing, and configured for attachment to the other of the door assembly of the vehicle and the body of the vehicle;

a coil spring supported by the housing and having a plurality of coils coiled about a portion of the length of the rod, the coil spring including a first axial end and a second axial end spaced from each other along the length of the rod and extending out of the housing; and an actuator coupled to the first axial end and the second axial end of the coil spring, and operable to contract the coils of the coil spring against the rod to tighten the coil spring against the rod, and wherein the actuator is operable to expand the coils of the coil spring to loosen the coil spring about the rod in response to a signal; and a plate rotatable about an axis and attached to both the first axial end and the second axial end of the coil spring;

wherein the actuator is coupled to the plate and operable to rotate the plate about the axis in both a first rotational direction and a second rotational direction, opposite the first rotational direction, wherein rotation of the plate in the first rotational direction tightens the coil spring against the rod to secure the rod relative to the coil spring and prevent movement of the door assembly relative to the body, and wherein rotation of the plate in the second rotational direction loosens the coil spring about the rod to allow the rod to move relative to the coil spring and allow the movement of the door assembly relative to the body.

8. A door check system as set forth in claim 7 further comprising a linkage interconnecting the actuator and the plate, wherein the linkage is moveable along a linear path in a first linear direction and a second linear direction, wherein movement of the linkage along the linear path in the first linear direction rotates the plate about the axis in the first rotational direction, and wherein movement of the linkage along the linear path in the second linear direction rotates the plate about the axis in the second rotational direction.

* * * * *